Aug. 9, 1960  L. R. ZEMAN  2,948,460
FLUID ACTUATED MOTION TRANSLATING DEVICE
Filed Aug. 20, 1956
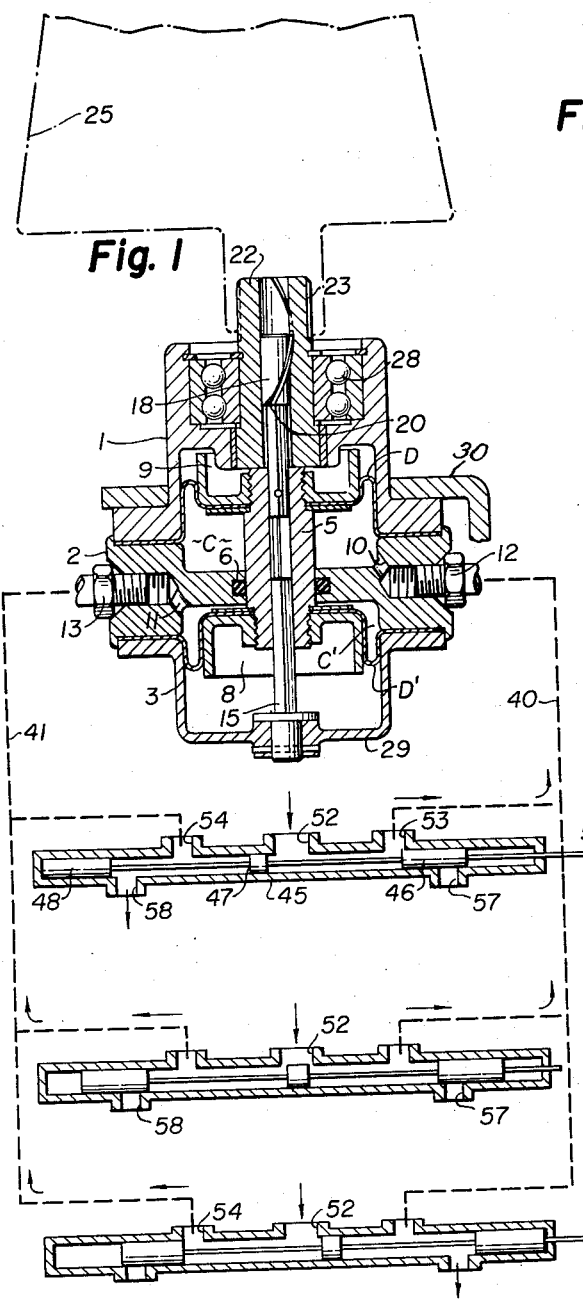
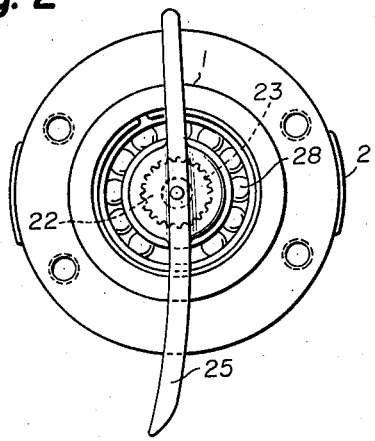
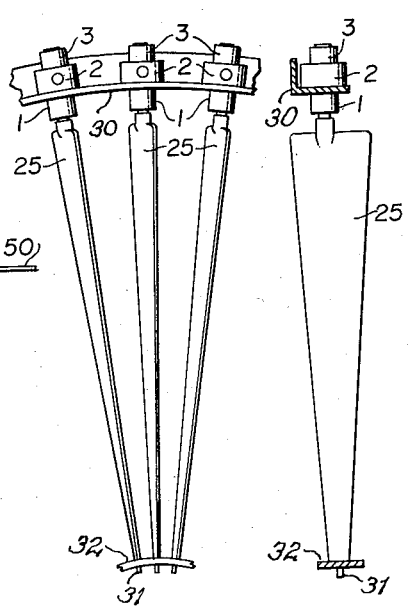
Fig. 1  Fig. 2  Fig. 4  Fig. 3
INVENTOR.
LADIMIR R. ZEMAN,
BY
Justin W. Macklin
ATTY United States Patent Office 2,948,460
Patented Aug. 9, 1960

2,948,460
FLUID ACTUATED MOTION TRANSLATING DEVICE

Ladimir R. Zeman, 1765 Belvoir Blvd., Cleveland, Ohio

Filed Aug. 20, 1956, Ser. No. 605,138

4 Claims. (Cl. 230—114)

This invention relates to a novel unitary device for converting linear motion into rotary motion, and which may be similarly used to effect linear motion by applying rotary motion.

In its preferred embodiment, the invention is particularly adapted for converting a short movement of an actuating element in a linear path to a relatively short rotary motion and with precise control, effectiveness and with provisions for locking or holding any given intermediate or extreme position of the moving parts.

Heretofore, mechanisms have been used which embodied means, such as pistons or diaphragms, capable of being reciprocated by fluid pressure, and which were so connected with a rotating element as to cause the reciprocating motion to effect rotation of the latter element. However, such devices are usually cumbersome, somewhat complicated, and too expensive for the purposes and uses to which they may be put, and, accordingly, are not capable of certain uses requiring the meeting of exacting conditions of delivering relatively high torque on the rotary member for precise number of degrees of rotation, which requirements include compactness, strength, and simplicity of operation and control.

For illustration, an adaptation requiring meeting of such exacting requirements, conditions and performance is that for the mounting and turning of a plurality of inlet stream guide vanes for jet engines, in addition to the requirements of compactness, strength, precision, must accurately control movement of the vanes through a desired limited number of degrees and fractions thereof, and in unison to move and position the vanes.

In the embodiment shown in the drawings of the present application and hereinafter described, I have provided such a unit which is rugged, compact, certain and precise in its operation, and which is capable of being cheaply manufactured, and durable and effective in use for such a purpose.

It is to be understood, however, that the structure and combination of elements disclosed and claimed herein is capable of many uses, and that it may be adapted for translating limited rotary motion into forcible and precise linear motion.

Other objects and advantages of the particular embodiment of my invention will become apparent in the following specification, and its essential characteristics are hereinafter summarized in the claims.

In the drawings:

Fig. 1 is an axial section through the device, in the upper portion of the figure an inlet stream control vane being shown in broken lines as attached thereto for operation thereby, while at the lower portion of the figure are shown three positions of a control valve operating means connected to the device by broken lines illustrative of tubing and connecting the valve with the device;

Fig. 2 is a plan view of the device indicating the position of a stream control vane connected thereto;

Fig. 3 is a side elevation on a reduced scale showing mounting rings in section and illustrating the inlet stream control vane;

Fig. 4 is an elevation showing a plurality of these vanes in a view taken at right angles to Fig. 3 and showing a mounting ring for a plurality of the device and an inner guide ring.

Referring to the parts by the use of reference characters, the housing comprises essentially two end sections and a mid section, which, for convenience, will be referred to as the upper section 1, the mid-section 2, and the lower section 3.

The upper and lower sections are shown as provided with outwardly extending flanges fitting flanges of similar width and diameter formed on a disk-like member comprising the middle section 2 which divides the housing into two pressure chambers.

A two-part piston actuating assembly comprises a reciprocating hub or shaft 5 slidable through the disk portion of the middle section element, which carries a sealing ring 6 of the O-ring type, preferably capable of slight rolling action, as is well known for tight sealing of such reciprocating parts, against loss of liquid pressure in either direction along the relatively sliding surfaces.

On each end of the reciprocating shaft element 5 may be provided a piston fitted in a fluid-tight manner to the cylindrical inner surfaces of the chambers above and below the mid-section. However, a much more effective and simple means of actuating the element 5, while maintaining a perfect seal throughout the long life and many actuations of the device, is to provide an annular folding type diaphragm D, known in the trade as a "Bellofram," each there shown as having a perimeter clamped between the flanges and then folded away from the central disk portion backwardly toward the same, and each having its mid-portion clamped between a disk and bottom of shallow, cup-like piston heads 8 and 9, the cylindrical side walls of which are a predetermined radial distance from the inner walls of cylindrical pressure chambers C and C'.

It will be noted that the annular folds, as at D', of the diaphragm remained the same, and the area defined by the radial dimension of these folds is, in effect, the only pressure receiving area of the diaphragm, while the major actuating pressure is applied directly to the inner sides of the cup assemblies 8 and 9.

Pressure fluid may be supplied through tubular connections, later to be described, and through passages 10 and 11 leading from threaded openings for receiving suitable fittings connected with the tubing to the chambers C and C' at either side of the central disk. The fittings and passages are indicated at 12 and 13, respectively.

The central rigid post 15 is shown as rigidly connected to the lower wall of the lower housing member 3, and as having its angular portion projecting upwardly into and slidably engaging an interfitting angular surface formed along the axis of the member 5. Thus, the member 5, cups 8 and 9, and diaphragm connections are prevented from any rotation.

Fitted into the upper portion of the angular axial portion of the piston hub or shaft 5 is an angular stud projection integral with the inner end of the driving element effecting the rotary motion, and shown as constituting a cylindrical stud 18, which is in turn provided with a very steep pitch spiral cam or thread-like rib 20. This spiral cam or rib 20 slidably engages a corresponding spiral groove formed in a cylindrical bore of the driving vane-carrying element 22, here shown as having a fluted portion at 23 to receive a non-rotatably, rigidly fit into the socket of the vane or other element to be rotated by the device. Such a vane is indicated at 25 in broken lines, in Fig. 1. The general shape and contour of the particular illustrative embodiment of such a vane is shown in solid lines in Figs. 2, 3 and 4.

The rotatable driven element 22 is preferably mounted to revolve in bearing elements, one of which is preferably a pair of roller bearing ball races, indicated generally at 28, while a sleeve bearing appears below the same embracing the lower surface, adding stability but permitting inlet and egress of air during operation to avoid vacuum or pressure at the outer side of the cup 9, adding to the force required for its actuation. A vent opening, indicated at 29, may be formed in the lower chamber for the same purpose.

Referring particularly to Figs. 3 and 4, in using the device for radially operating inlet stream guide vanes for jet engines, it may be assumed that a considerable number of the devices are mounted in closely spaced positions on an annular support, for purposes of illustration, here indicated as a flanged ring 30 having a cylindrical portion provided with openings to receive the section 1 of each device, and which may be firmly secured in any suitable manner. The inlet guide vanes 25 converge inwardly and may be pivoted, as at 31, to an inner ring 32 of suitable rigid construction. It is assumed that the liquid pressure lines 40 and 41 are suitably connected for simultaneously operating these devices, as will presently appear.

When the parts are in the position shown in Fig. 1, it may be assumed that pressure fluid such as oil has been forced into the chamber C while a corresponding charge of liquid has been exhausted from the lower pressure chamber C'; thus moving the piston hub and cups upwardly. The spiral thread 20 and its coacting thread groove on the driven member 22 has turned the latter through a predetermined fraction of a rotation.

If now the pressure in the chamber C be released and the oil be permitted to flow outwardly through the orifice 10, while pressure is supplied to the chamber C' by liquid flowing through the orifice 11, the piston elements and diaphragms are moved downwardly, causing a partial rotative reverse movement of the member 22. It is apparent that the sliding but non-rotating engagement with the angular post 15 has prevented any rotation of the reciprocating parts.

The valve control arrangement whereby the amount of linear movement of the actuating piston assembly may be controlled, its speed and force controlled, and whereby it may be reversed or stopped and held under pressure and be locked in any given position at its extremities or therebetween, may be of any suitable construction, it being essential only that a source of pressure fluid be connected to the chambers and that it be so controlled as to alternately fill one under pressure while releasing the fluid from the other chamber. Such an element is diagrammatically illustrated in three illustrative positions in the lower portion of Fig. 1 where the dotted lines 40 and 41 indicate tubular connections with the chambers C and C', respectively.

As diagrammatically shown, the valve may comprise a tubular valve body 45 having a longitudinal cylindrical passage bore therein, into which are fitted valve elements 46, 47 and 48 rigid with a reciprocating rod 50 serving as an actuating valve stem. An inlet opening in the valve casing is indicated at 52 intermediate two openings 53 and 54, connected with the tubular lines 40 and 41.

Assuming that oil is brought to the inlet opening 52 and flows inwardly, as indicated by the arrow, and that the valve elements 46 and 47 are positioned to permit passage of fluid from the opening 52 to the opening 53, and, thus, through the tube 40, and the inlet orifice 10 to the chamber C, the piston will be moved upwardly. If now the pressure flow is continued, the piston will move to its uppermost position where the top of the member 5 engages the inner end of the member 22, limiting this upward stroke.

As long as this pressure is thus applied, the parts will remain in this position, with the corresponding angular placement of the driven element, and any connected part, such as the jet engine inlet vane 25, will correspondingly be held in the position thus given it.

This valve position is indicated in the uppermost of the three diagrammatic illustrations in Fig. 1. The intermediate valve positions indicate that at any point of the linear movement of the piston and diaphragm assembly, the flow to the pressure side of it and the flow from the exit side may be stopped and balanced by bringing the valve members 46 and 48 to a position to close the passage from the valve orifices 53 and 54 to the orifices 57 and 58. Such a position is illustrated in the intermediate diagram of the valve assembly.

The lower diagram of the valve assembly shows another position in which it may be assumed the pressure fluid flowing into the inlet 52 and out of the connecting opening 54 through the tubular connection 41 is passing into the chamber C'; through the orifice 11, thus effecting a reverse motion of the piston and diaphragm assembly, and correspondingly, reversing the partial rotary movement of the driven element 22. Obviously, this would correspondingly move and reposition any driven element mounted thereon, such as the vane 25.

Further, it is obvious that by controlling the rate of flow of the pressure fluid, the rate of movement of the piston assembly and angular turning of the driven element may be governed very precisely.

It is to be understood that among the exacting requirements of such a use are that of withstanding high pressures and, in many environments, that the diaphragms must also be of such composition as to withstand considerable high temperature. Such diaphragms as indicated are capable of great flexibility in bending, while remaining substantially inextensible; and they may comprise a thin woven fabric of heat-resistant material, such as fibre glass impregnated with a flexible heat-resistant plastic material.

The weight of such a device must be held to a minimum for its size and power delivery, as well as for rigidity, when locked in any of its predetermined positions of angular movement of the diaphragm element.

Having thus described my invention, what I claim is:

1. In a motion translating device, the combination of a housing having a fixed transverse wall positioned for dividing the interior of the housing into two pressure chambers and having a central circular opening, reciprocating means slidably extending through the opening in the said dividing wall, a rigid non-circular post slidably engaging the reciprocating means along its axis for preventing rotation thereof with relation to the housing, means in each chamber rigidly connected to the reciprocating means and each adapted to be subject to fluid pressure to move the reciprocating means, an actuating member rigidly connected to the reciprocating means, a rotating element embracing the actuating member, interengaging steep spiral shoulders on the actuating means and the rotating element whereby when the actuating means is reciprocated, the driven element is rotated.

2. A means for effecting simultaneous rotary motion of and adapted for holding a plurality of inlet guide vanes of a jet engine in predetermined positions, said means comprising a plurality of devices each having means for rigid connection with one guide vane and means for mounting said devices in an annular arrangement, each actuating device comprising a housing, a rotatable element carried thereby, two chambers in said housing, a diaphragm and a reciprocating element connected with the diaphragm while its perimeter forms a seal with the wall of the chamber, a rigid angular post slidably engaging said element along its axis and means for directing fluid to opposite surfaces of the diaphragm including a valve and tubular connections arranged to permit fluid to flow to either side of the diaphragm and arranged so that in another position equal pressure may be directed to the diaphragm in any position of its longitudinal movement and in another position for locking the pressure fluid from escape from the chambers to hold the reciprocating element against movement, and whereby a connected guide vane may be held in a selected position, said fluid pressure means being so arranged as to simultaneously act upon all of said devices.

3. In a means adapted for simultaneously effecting angular movement of inlet guide vanes of jet engines, comprising an actuating device having means for connection to each of a plurality of vanes arranged over the circular intake area, each said device comprising a housing consisting of two chamber portions and a dividing wall element extending transversely between said chamber portions of the housing, said dividing wall and chamber portions being provided with registering flanges, bellows-type diaphragms each having its perimeter clamped between said flanges at one side of the dividing wall member, a piston assembly comprising cup-shaped heads each tightly fitted to the inner portion of one of said diaphragms, the side walls of which heads limit the pressure area and fold of the diaphragm, a reciprocating member connecting the two cup-shaped elements and extending through said dividing wall, sealing means between the wall and said last-named member, and means preventing rotation thereof, the connection between the rotating member and the vane and a spiral driving connection between the rotating and reciprocating members, and means for supplying liquid pressure to either or both sides of said wall simultaneously and for locking said liquid at either or both sides thereof, a pressure liquid supply being connected with all of said elements whereby uniform simultaneous movement and holding action for guide vanes may be effected.

4. In a device of the character described adapted to angularly position an inlet guide vane of a jet engine, the combination of a housing comprising two hollow portions and an intermediate transverse wall dividing the housing into two chambers, a rotating member adapted to be connected to said vane and bearings therefor carried by one portion of the housing, an axially positioned reciprocating member extending thorugh said wall and having an angular interior guide surface along its axis, a fluid-tight seal preventing passage of fluid along said reciprocating member at said wall, a rigidly axially positioned angular post slidably engaging said interior guide surface, flexible diaphragms and coacting supporting cup-like members securing the inner areas thereof to the reciprocating member, the perimeters of each diaphragm extending between contiguous housing members outside of each chamber and tightly clamped therebetween, the intermediate annular area of each diaphragm being folded back upon itself, a passage leading to each of said chambers, tubular connections leading to each of said passages, a valve mechanism for controlling said passages for supplying fluid simultaneously or separately to said chambers, a spiral driving connection between the reciprocating member and the rotating member whereby a guide vane connected thereto may be held in any selected position within a limited number of degrees of movement by the operation of the valve directing fluid to one chamber or the other or simultaneously to both of them under pressure.

References Cited in the file of this patent

UNITED STATES PATENTS

| 862,867 | Eggleston | Aug. 6, 1907 |
| 2,392,341 | Squier | Jan. 8, 1946 |
| 2,671,634 | Morley | Mar. 9, 1954 |
| 2,683,580 | Griswold | July 13, 1954 |

FOREIGN PATENTS

| 539,303 | Great Britain | Sept. 4, 1941 |